Feb. 27, 1934.   G. T. KINNEY   1,948,819
LUBRICATING MEANS
Filed Aug. 6, 1931

INVENTOR
Grayson T. Kinney
BY George Douglas Jones
HIS ATTORNEY

Patented Feb. 27, 1934

1,948,819

UNITED STATES PATENT OFFICE 1,948,819

LUBRICATING MEANS

Grayson T. Kinney, Cleveland, Ohio, assignor to The Cleveland Tractor Company, Cleveland, Ohio Application August 6, 1931. Serial No. 555,553

3 Claims. (Cl. 184—6)

This invention relates to propelled shafts, and more particularly to lubricating means for an inaccessible bearing for said shaft.

In motor vehicles, and more especially tractors, the driven shaft usually terminates at the fly wheel and operates in a bearing located in an annular recess of the fly wheel, the bearing therefore is extremely inaccessible.

In addition to the inaccessibility caused by the surrounding clutch structure, there is an enclosing casing which forms a housing for the clutch mechanism and the driven elements which must be kept free of lubricants, consequently accessibility for the purpose of periodic lubrication is extremely difficult and is therefore frequently neglected.

There is also a tendency, when lubrication is applied by a mechanic or operator that an over supply will be injected into the bearings and consequently an excess, it being very difficult to observe the amount of lubricant supplied, the excess lubricant will obviously saturate the working parts of the clutch, which is exceedingly detrimental to the proper functioning thereof, and as a result, the clutch will cease to function due to slipping of the frictional contacting members of the clutch.

An object of my invention is to supply lubricant to the front bearing of a driven shaft by means of an oil reservoir contained in the driven shaft.

Another object of my invention is to supply lubricant to the front bearing of a driven shaft in a limited quantity, which is carried thereto through a wicking, which receives its lubricant supply from a reservoir contained within the driven shaft, the lubricant being supplied from the wicking to the bearing by centrifugal action.

A further object of my invention is to supply lubricant to the front bearing of a propelled shaft having an oil reservoir contained with the driven shaft and means for filling the reservoir.

Still a further object of my invention is to continuously lubricate an inaccessible bearing when in motion, wherein oil is stored within the shaft working in the bearing and metering means for supplying a given quantity of lubricant.

The invention with other objects and advantages thereof, and the particular construction, combination and arrangement of parts comprising the same will be understood from the hereinafter contained description, when considered in connection with the accompanying drawing forming a part thereof and illustrating one embodiment of the invention.

Figure 1:
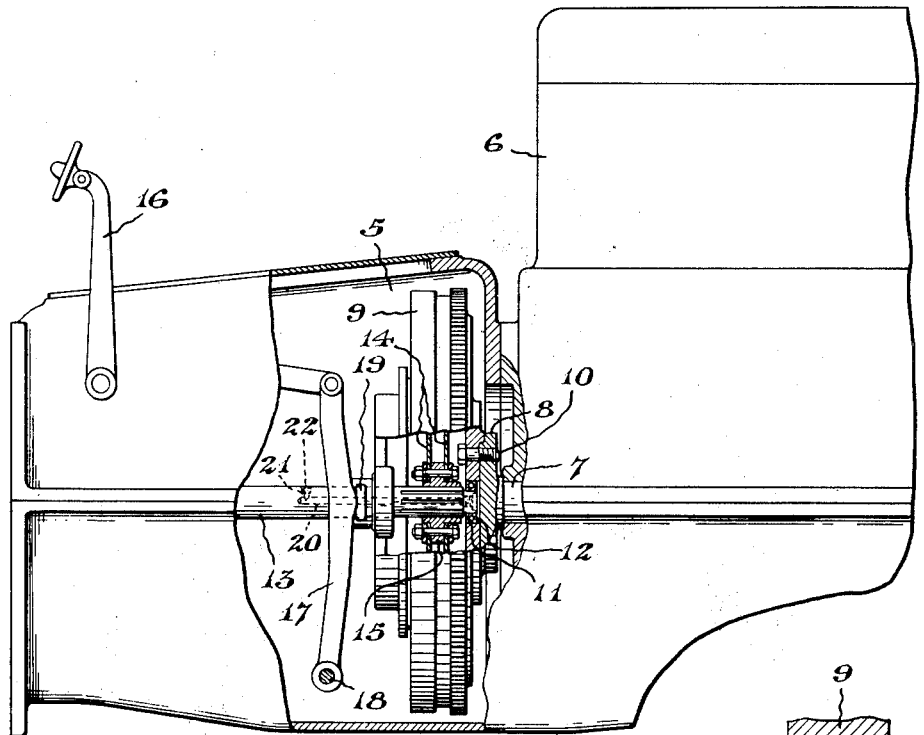
Fig. 1 is a fragmentary portion of an automotive device, partly in section and partly in elevation showing my invention associated with the driven shaft and clutch mechanism.
Figure 2:
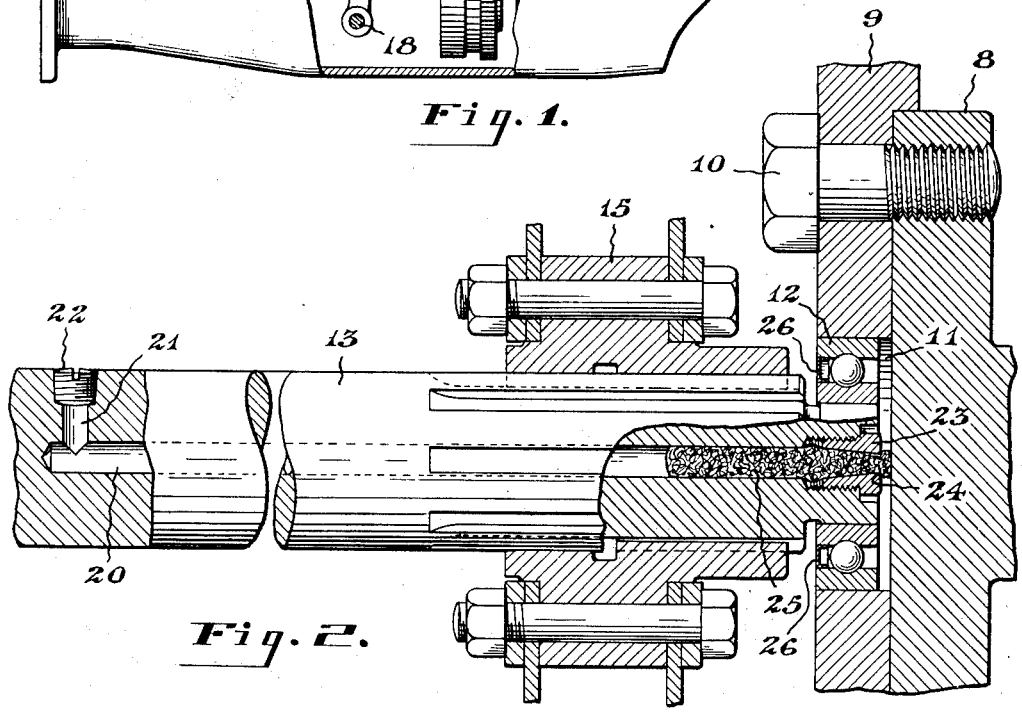
Fig. 2 is an enlarged section of the fly wheel, a portion of the clutch member and the driven shaft, with a fragmentary section of the front end of the same.

Referring now to the drawing by numerals and reference, wherein like numerals correspond to like parts, the reference numeral 5 indicates the forward portion of a transmission housing, securely attached to a motor 6 which contains cylinders, a crank shaft, pistons and other mechanism to form an engine, preferably of the internal combustion type. The crank shaft 7 terminates in a flange member 8 which is secured to a fly wheel 9 exteriorly thereof by bolts 10. Located at the axis of the fly wheel is a radial recess 11 in which is mounted an antifrictional bearing 12, the bearing being provided with an annular oil retainer plate 26 to retain lubricant therein.

The driven shaft 13 extends longitudinally through the transmission case, the forward end of which is mounted in the bearing 12.

The frictional elements 14 of the clutch are secured to a carrier 15 which is slidably splined on the driven shaft at the rear of the bearing 12. The clutch mechanism operates by pressing forward on foot lever 16 which is linked to the clutch throwout yoke 17, this yoke is pivoted at 18 and when pressure is applied the yoke contacts the clutch throwout collar 19 which releases the frictional contact elements of the clutch discs.

This is a conventional clutch and declutching method used in motor vehicles and does not form a part of this invention.

It will be seen that the bearing 12 is completely enclosed by the clutch structure and the fly wheel, and is therefore inaccessible for lubrication from the exterior due to the surrounding structures and the transmission case, without removing a portion of the mechanism.

It will be understood that the compartment housing the fly wheel and clutch mechanism must be kept free from lubricants which otherwise would affect the normal function of the same and render the clutch inoperative, although it will be appreciated that bearing 12 be kept constantly lubricated.

I, therefore, provide a central passage 20 which extends rearward in the driven shaft 13 and communicating with the end of the passage 20 is a threaded oil inlet aperture 21 transversely of the shaft 13, a threaded plug 22 which may be easily and quickly removed seals the aperture from loss of lubricant.

Located in the front end of the driven shaft 13 is a threaded nozzle 23 screwed into the passage 20, a restricted passage 24 extends axially through the nozzle for the reception of wicking 25, the front end of which abuts the annular recess 11, and the other end extends into passageway 20 of the driven shaft 13.

The wicking is compressed in the restricted passage 24 and the oil taken from the chamber 20 by the wicking 25 by capillary action through the restricted passage 24, constantly moistens the annular recess 11, and by centrifugal action sufficient lubricant is carried on the wall of the annular recess to lubricate the bearing 12. The bearing 12 is provided with a conventional oil retainer member 26, which is secured to the outer race of the bearing and abutting the inner race, thus preventing lubricant from being thrown by the centrifugal action of the bearing. The restricted passage 24 compresses the wicking to retard the capillary action of the oil, thus allowing a small quantity of oil to be deposited in the annular recess, to sufficiently lubricate the bearing without an excess of oil being thrown into the clutch mechanism.

It will be seen that I have provided a simple continuous lubricating system for constantly lubricating the antifriction bearing at the front end of the driven shaft, which will not flood the surrounding elements, and that the bearing will never become dry unless the oil contained in the oil passage 20 is permitted to run dry and lubricating action takes place only when the mechanism is in motion. The filling of the lubricant passage is accomplished by removing the plug 22 and by any suitable filling means such as an oil can, the passage can be quickly refilled with lubricant and the plug replaced. One filling will lubricate the bearing for a long period of time and therefore only occasional lubrication is required to keep the bearing in good working condition.

While I have shown and described the preferred embodiment of the invention, it should be understood that I reserve the right to make such changes in the form, construction and arrangement of parts as will not depart from the spirit of the invention or the scope of the claims.

What I claim is:—

1. In a power transmitting mechanism, a driving shaft and a propelled shaft, a bearing carried by the driving shaft, and supporting the propelled shaft, connecting and disconnecting means between the driving and propelled shaft, a lubricant reservoir contained axially within the propelled shaft wicking and centrifugal means for conveying lubricant in restricted quantities from the lubricant reservoir to the bearing and lubricant retaining means on the bearing.

2. In a power transmitting mechanism, a driving shaft having a fly wheel located at one end thereof, an annular recessed chamber axially in the fly wheel, a bearing mounted in the axial chamber, a propelled shaft with an axial lubricant chamber in the end portion thereof and carried in the bearing, a removable nozzle having a restricted passage therein secured in the end of the lubricant chamber of the propelled shaft, a wicking carried by and extending through the nozzle and abutting the wall of the recessed chamber for conveying lubricant in restricted quantities to the said recessed chamber and thence, by centrifugal action, to the bearing.

3. In a power transmitting mechanism, a driving shaft having bearings therefor and a fly wheel abutting one end of the driving shaft, an axial recessed chamber in said fly wheel, a bearing within the recessed chamber, a propelled shaft, one end of which is carried by the bearing in the chamber and abutting the fly wheel, clutch mechanism mounted in the fly wheel and on the propelled shaft making the bearing inaccessible, a lubricant reservoir contained axially within the propelled shaft having an opening for refilling in an accessible portion of the shaft, wicking within the lubricant reservoir abutting the recessed chamber conveying lubricant in restricted quantities to the wall of the recessed chamber and by centrifugal action of the propelled shaft lubricant is conveyed to the bearing and retained within the bearing by lubricant retaining means.

GRAYSON T. KINNEY.